(12) United States Patent
Takasaki et al.

(10) Patent No.: US 8,231,143 B2
(45) Date of Patent: Jul. 31, 2012

(54) DOUBLE PIPE CONTAINMENT STRUCTURE

(75) Inventors: Hiromi Takasaki, Saitama (JP); Fuminori Ooba, Saitama (JP); Ken Ishihara, Saitama (JP); Susumu Satou, Ashikaga (JP)

(73) Assignee: Calsonic Kansei Corporation, Saitama (JP)

( * ) Notice: Subject to any disclaimer, the term of this patent is extended or adjusted under 35 U.S.C. 154(b) by 441 days.

(21) Appl. No.: 12/379,669

(22) Filed: Feb. 26, 2009

(65) Prior Publication Data
US 2009/0236849 A1   Sep. 24, 2009

(30) Foreign Application Priority Data
Feb. 29, 2008   (JP) ................. 2008-049046

(51) Int. Cl.
*F16L 39/00* (2006.01)
*F16L 7/02* (2006.01)
(52) U.S. Cl. ................. 285/123.15; 285/123.3
(58) Field of Classification Search ............ 285/123.1, 285/123.3, 123.15, 123.17, 122.1
See application file for complete search history.

(56) References Cited

U.S. PATENT DOCUMENTS

| | | | | |
|---|---|---|---|---|
| 5,156,191 A | * | 10/1992 | Walker et al. ............ | 138/113 |
| 5,749,138 A | * | 5/1998 | Usui et al. ............... | 29/516 |
| 6,131,615 A | * | 10/2000 | Hartnagel et al. ........ | 138/113 |
| 6,145,545 A | * | 11/2000 | Hartnagel et al. ........ | 138/113 |
| 6,533,328 B2 | * | 3/2003 | Takamatsu ............... | 285/123.15 |
| 6,866,090 B2 | * | 3/2005 | Takamatsu et al. ....... | 165/41 |
| 7,021,670 B2 | * | 4/2006 | Takasaki et al. .......... | 285/124.1 |
| 7,753,413 B2 | * | 7/2010 | Yoshino et al. .......... | 285/123.12 |
| 2001/0020786 A1 | * | 9/2001 | Takamatsu et al. ....... | 285/123.1 |
| 2003/0218332 A1 | * | 11/2003 | Takasaki et al. .......... | 285/123.3 |
| 2004/0169369 A1 | * | 9/2004 | Takamatsu et al. ....... | 285/124.1 |
| 2004/0261450 A1 | | 12/2004 | Yoshino et al. | |
| 2009/0140515 A1 | * | 6/2009 | Ichimura et al. ......... | 285/124.5 |

FOREIGN PATENT DOCUMENTS

| | | |
|---|---|---|
| EP | 1 128 120 | 8/2001 |
| JP | 2004-270928 | 9/2004 |

OTHER PUBLICATIONS

European Search Report issued Aug. 14, 2009 in connection with EP 09 00 2555.

* cited by examiner

*Primary Examiner* — James Hewitt
(74) *Attorney, Agent, or Firm* — Wenderoth, Lind & Ponack, L.L.P.

(57) ABSTRACT

A double pipe connection structure includes a joint member and a double pipe having an inner pipe and an outer pipe coaxially disposed therein. Further, the double pipe connection structure includes a supporting rib formed integrally therewith in an axial direction, wherein the supporting rib connects the inner pipe to the outer pipe. Further, the joint member includes a first hole into which the outer pipe is inserted and a second hole into which the inner pipe is inserted, wherein the second hole has a diameter that is smaller than a diameter of the first hole, and wherein the first and second holes are bored to be aligned in an axial direction. Moreover, in the joint member, a first-pressure connecting hole communicates with the first hold and a second-pressure connecting hole communicates with the second hole, such that a pressure in the first-pressure connecting hole is lower than a pressure in the second-pressure connecting hole.

3 Claims, 9 Drawing Sheets

DOUBLE PIPE CONTAINMENT STRUCTURE

CROSS-REFERENCE TO THE RELATED APPLICATIONS

This application is based on and claims the priority benefit of Japanese Patent Application No. 2008-049046, filed on Feb. 29, 2008, the disclosure of which is incorporated herein by reference in its entirety.

BACKGROUND OF THE INVENTION

1. Field of the Invention

The present invention relates to a double pipe connection structure and a method for connecting a double pipe, and particularly, relates to a double pipe connection structure and a method for connecting a double pipe in which caulking is used for connection of the double pipe.

2. Description of the Related Art

Conventionally, brazing has been usually used for connection of a double pipe. However, in this case, there have been problems that connection work takes time and effort, a degree of difficulty in connection is higher, process costs are comparatively high, and the like.

In this regard, for example, Japanese Patent Application Publication No. 2004-270928, or the like, has proposed a method of connecting a double pipe using caulking without brazing.

The related art disclosed in Japanese Patent Application Publication No. 2004-270928 provides a structure in which a bypass inner pipe having an O-ring mounted on an outer periphery thereof is inserted into an end of an inner pipe, an end part of this bypass inner pipe is inserted into a small diameter hole in a branch joint, an outer pipe having an O-ring mounted thereon is inserted into a large diameter hole coaxial with the small diameter hole in the branch joint, and a main body part that forms the large diameter hole is caulked to a depressed groove part formed on an outer periphery of the outer pipe.

However, in the above-mentioned prior art, since the bypass inner pipe formed separately from the double pipe is mounted on the double pipe, the bypass inner pipe causes increase in the number of components and increase in cost.

In addition, in order to mount the bypass inner pipe, the diameter of the inner pipe is expanded. Furthermore, in order to mount the O-ring on the outer pipe, the O-ring is mounted on the depressed groove formed by depressing a general part of the outer pipe inward.

For this reason, a flow passage area between the outer pipe and the inner pipe is narrowed, and flow resistance of a fluid flowing in the outer pipe increases.

Moreover, the outer pipe has a fixed diameter, a diameter of a large diameter hole in a joint member is limited, and flexibility of connection is low.

SUMMARY OF THE INVENTION

The present invention has been made in consideration of the above-mentioned conventional problems. An object of the present invention is to provide a double pipe connection structure and a method for connecting a double pipe that allows reduction in cost by reducing the number of components, and reduction in flow resistance, and improvement in connection flexibility.

In order to accomplish the aforementioned object, a double pipe connection structure according to one embodiment of the present invention includes: a double pipe which is formed in a dual structure having an inner pipe and an outer pipe coaxially disposed therein, and which has a supporting rib formed integrally therewith in an axial direction, the supporting rib connecting the inner pipe to the outer pipe; a joint member including a large diameter hole into which the outer pipe can be inserted, and a small diameter hole into which the inner pipe can inserted, the large diameter hole and small diameter hole being bored to be aligned in the axial direction, a large-diameter-hole side communicating path is connected to the large diameter hole, and a small-diameter-hole side communicating path is connected to the small diameter hole; an inner pipe end portion formed by removing the outer pipe and the supporting rib at a distal end portion of the double pipe so as to project from a distal end of the outer pipe; an inner pipe side O-ring mounted on the inner pipe end portion around a periphery thereof; an outer pipe expanded part detached from the supporting rib at the distal end portion of the outer pipe and having a diameter expanded more than a general part of the outer pipe; and an outer pipe side O-ring mounted on the outer pipe expanded part around a periphery thereof.

The inner pipe end portion is inserted into the small diameter hole while the inner pipe side O-ring is press-contacted with an inner periphery of the small diameter hole, and a periphery of an open end portion of the large diameter hole in the joint member is caulked to the outer pipe expanded part so that the outer pipe is coupled with the joint member, with the outer pipe expanded part being inserted into the large diameter hole while the outer pipe side O-ring is press-contacted with an inner periphery of the large diameter hole.

Moreover, a method for connecting a double pipe according to one embodiment of the present invention includes: in an end portion of a double pipe which is formed to have a dual structure where an inner pipe and an outer pipe are coaxially disposed, and which has a supporting rib connecting inner pipe to the outer pipe and being formed integrally in an axial direction.

the method includes the steps of: removing the outer pipe and the supporting rib to form an inner pipe end portion projected from a distal end of the outer pipe; detaching a remaining end portion of the outer pipe from the supporting rib to form an outer pipe expanded part whose diameter is expanded more than that of a general part of the outer pipe; mounting an inner pipe side O-ring on the inner pipe end portion around a periphery thereof, and mounting an outer pipe side O-ring on the outer pipe expanded part around a periphery thereof; inserting the double pipe into a joint member in such a way that the inner pipe end portion is inserted into the small diameter hole while the inner pipe side O-ring is press-contacted with an inner periphery of the small diameter hole, and that the outer pipe end portion is inserted into the large diameter hole while the outer pipe side O-ring is press-contacted with an inner periphery of the large diameter hole, the joint member having a large diameter hole into which the outer pipe can be inserted and a small diameter hole into which the inner pipe can be inserted, the large diameter hole and the small diameter hole being bored to be aligned in an axial direction; and caulking a periphery of an open end portion of the large diameter hole in the joint member to couple the double pipe to the joint member.

DETAILED DESCRIPTION OF THE PREFERRED EMBODIMENTS

Preferred embodiments of the present invention are described in detail hereinafter with reference to the accompanying drawings.

[Embodiment 1]

FIGS. 1 to 10 illustrate a double pipe connection structure A according to an embodiment 1 of the present invention.

Figure 2:
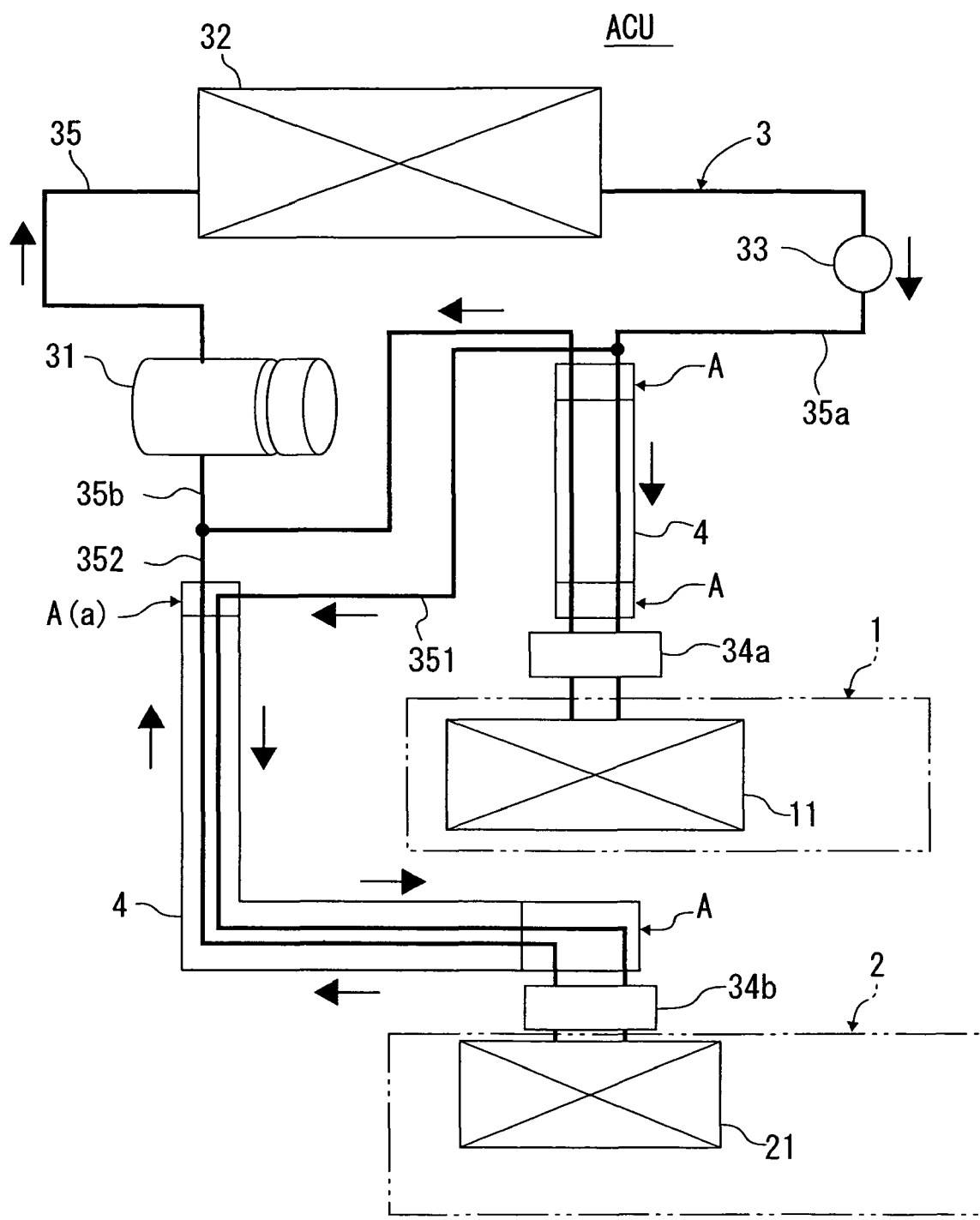
FIG. 2 is an overall system diagram showing an air-conditioner ACU for a vehicle to which the double pipe connection structure A according to embodiment 1 is applied.

FIG. 2 illustrates a piping structure of an air-conditioner ACU for a vehicle to which the double pipe connection structure A is applied.

This air-conditioner ACU for a vehicle includes a front seat side air-conditioning unit 1 that sends air to a front seat side of the vehicle (not shown), and a backseat side air-conditioning unit 2 that sends air to a backseat side of the vehicle (not shown).

A front evaporator 11 is installed in the front seat side air-conditioning unit 1, and a rear evaporator 21 is installed in the backseat side air-conditioning unit 2.

Each of the evaporators 11 and 21 is connected in parallel with a refrigerating cycle 3. As known, this refrigerating cycle 3 includes a conduit line 35 in which a fluid sequentially circulates a compressor 31 that is driven by an engine for running (not shown) and compresses a refrigerant; a condenser 32 that cools the refrigerant turned into a high pressure gas by the compressor 31 to obtain a saturated liquid; a liquid tank 33 for performing gas liquid separation of the refrigerant; expansion valves 34a and 34b that turn the refrigerant into a steam of low temperature and low pressure; and the evaporators 11 and 21. Other than the compressor driven by the engine, a compressor driven by electricity can also be used.

In the conduit line 35 of the refrigerating cycle 3 thus configured, in the case of the present embodiment 1, double pipes 4 and 4 are used for parts where a high-pressure refrigerant passage 35a extending from the liquid tank 33 to the expansion valves 34a and 34b is disposed in parallel with a low-pressure refrigerant passage 35b extending from each of the front evaporator 11 and the rear evaporator 21 to the compressor 31.

Double pipe connection structures A and A according to the embodiment 1 are used for a piping connection part of both ends of this double pipe 4.

Next, the double pipe connection structure A is described. Since the four of the double pipe connection structures A shown in FIG. 2 have the same structure, among these, description is given on the double pipe connection structure A (shown as A (a) in FIG. 2), as a representative. The double pipe connection structure A is used for connection between the double pipe 4 that supplies the refrigerant to the rear evaporator 21 and a high-pressure piping 351 that forms the high-pressure refrigerant passage 35a as well as a low-pressure piping 352 that forms the low-pressure refrigerant passage 35b in the conduit line 35 of the refrigerating cycle 3 as described above.

Figure 5:
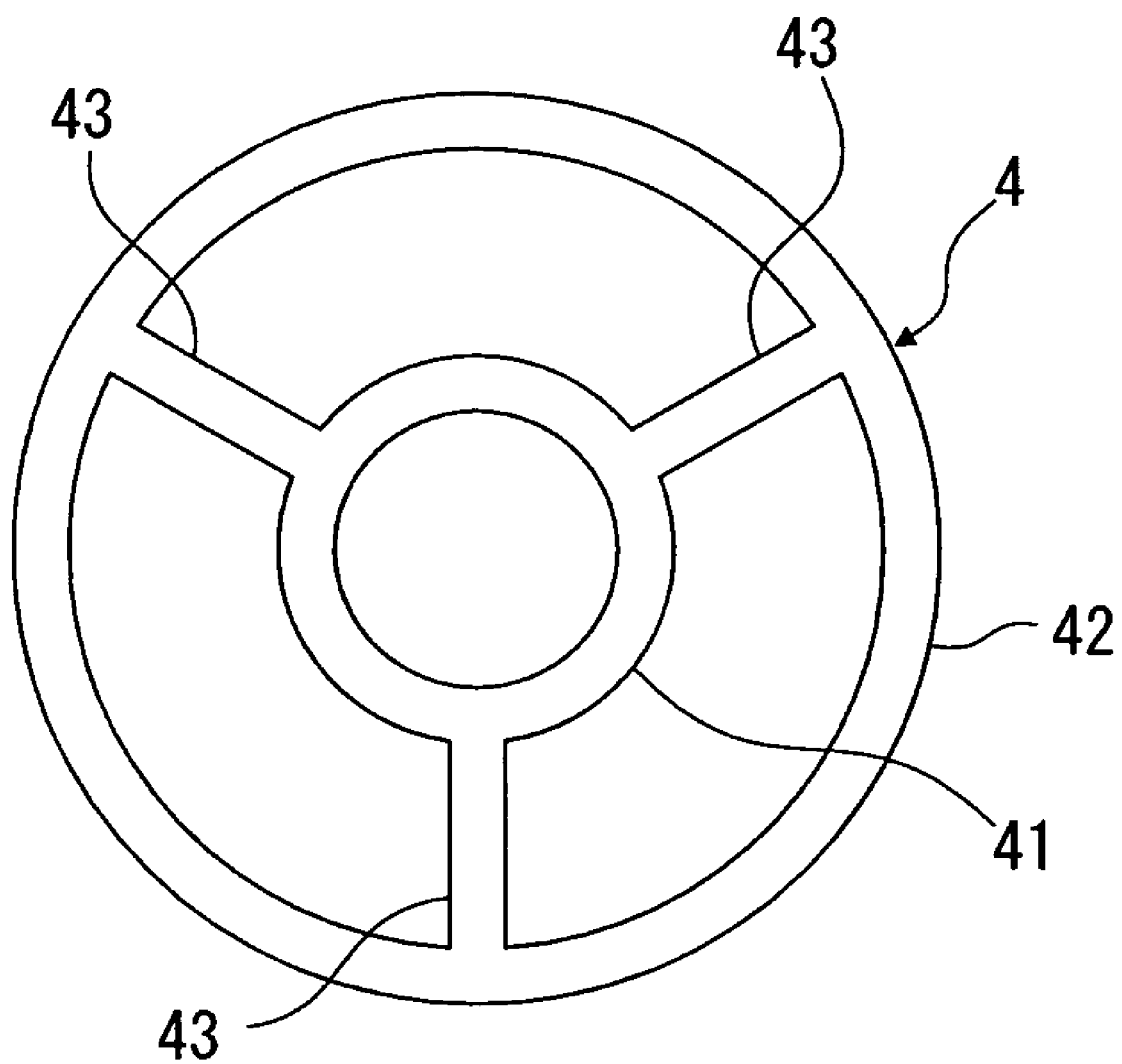
FIG. 5 is a sectional view showing the double pipe of the double pipe connection structure A according to embodiment 1.
Figure 6:
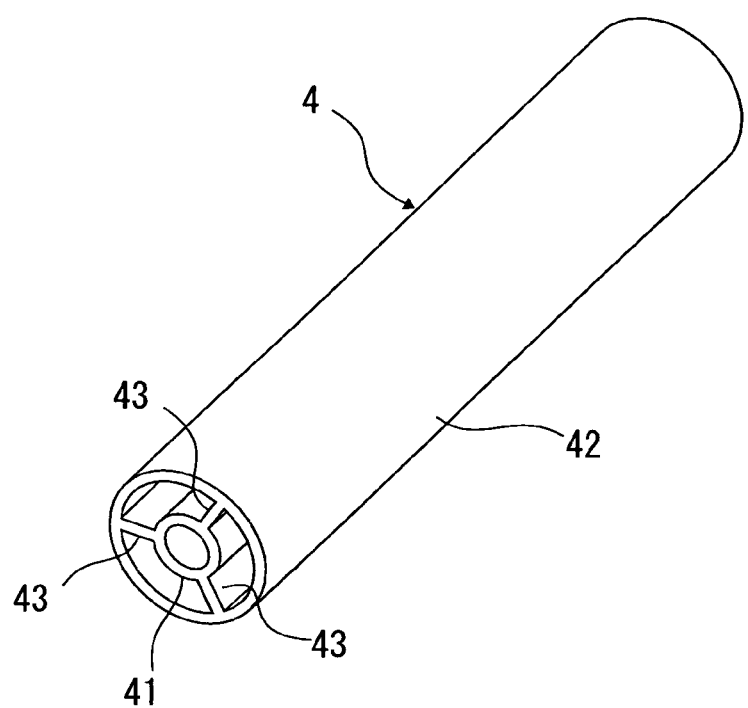
FIG. 6 is a perspective view showing a state before performing a previous process of the double pipe used for the double pipe connection structure A according to embodiment 1.

The double pipe 4 used for this double pipe connection structure A is, for example, a metal extrusion-molded product made of aluminum. As shown in FIGS. 5 and 6, the double pipe 4 includes an inner pipe 41, an outer pipe 42 provided coaxial with this inner pipe 41 on the outer side of the inner pipe 41, and three supporting ribs 43, 43, and 43 erected in a radial direction between the outer pipe 42 and the inner pipe 41 and integrally formed to connect the outer pipe 42 and the inner pipe 41.

Figure 1:
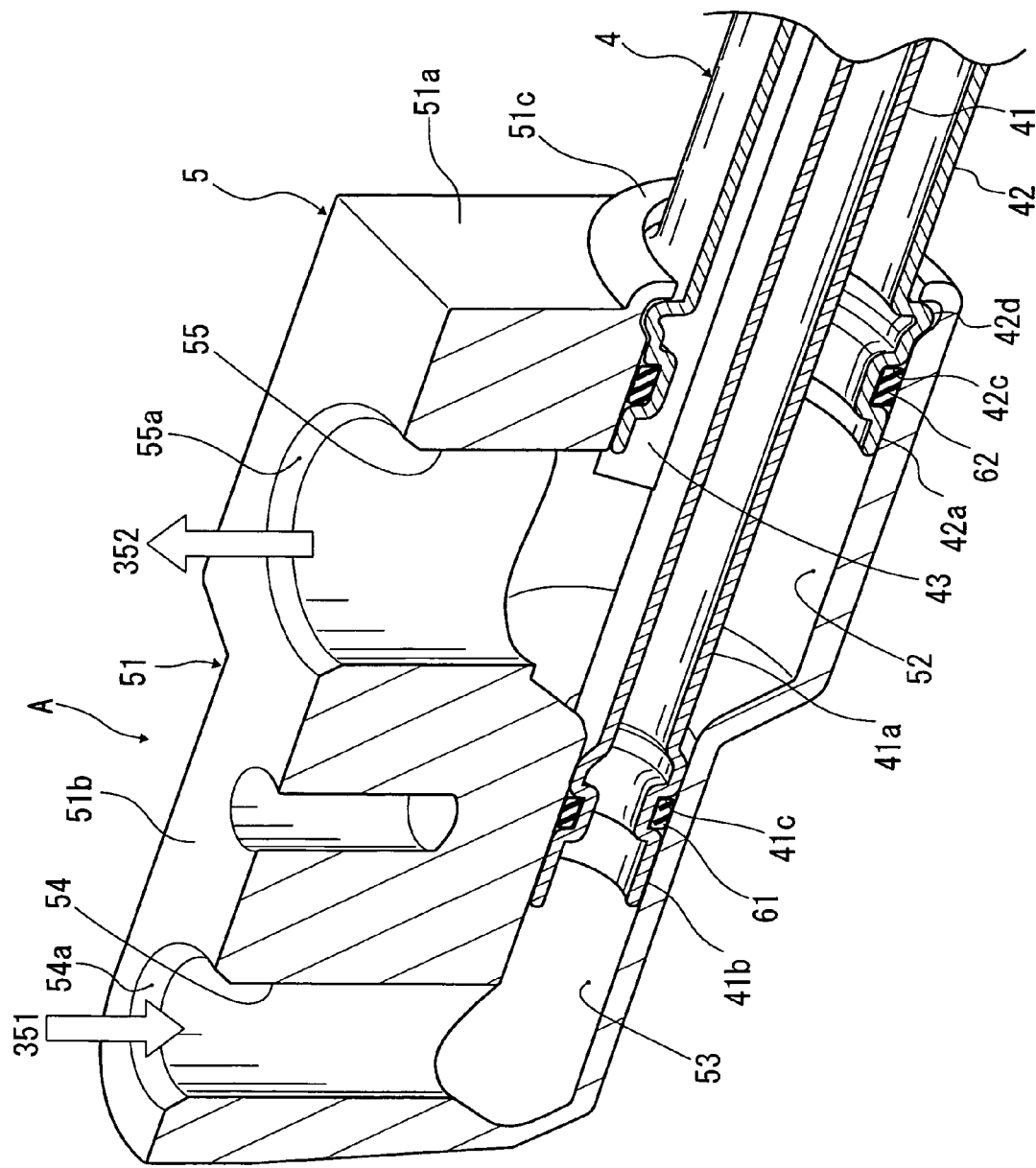
FIG. 1 is a perspective view showing a double pipe connection structure A according to embodiment 1 of the present invention, with a part thereof being cut off.

A joint member 5 shown in FIG. 1 is interposed between the double pipe 4 and the high-pressure piping 351 as well as the low-pressure piping 352. This joint member 5 is a metal casted product made of aluminum or the like. The joint member 5 includes a main body 51, a large diameter hole 52, a small diameter hole 53, a high-pressure connecting hole 54 (communicating path on the small diameter hole side), and a low-pressure connecting hole 55 (communicating path on the large diameter hole side).

The main body 51 is formed in a shape where two approximately rectangular parallelepipeds each having a different thickness are connected, as shown in FIG. 1.

The large diameter hole 52 is bored from a side surface 51a of the main body 51, which is on the right side in FIG. 1, to an intermediate part of the main body 51. The large diameter hole 52 is formed to have an inner diameter larger than an outer diameter of the outer pipe 42 of the double pipe 4.

The small diameter hole 53 is continuously formed at an end of the large diameter hole 52 coaxial with the large diameter hole 52. The small diameter hole 53 is formed to have an inner diameter larger than an outer diameter of the inner pipe 41 of the double pipe 4.

The high-pressure connecting hole 54 is bored so as to communicate a side surface 51b of the main body 51, which is above in FIG. 1, with an end of the small diameter hole 53. An opening 54a of the high-pressure connecting hole 54 is connected with the high-pressure piping 351.

The low-pressure connecting hole 55 is bored so as to communicate the side surface 51b of the body 51, which is above in FIG. 1, with the end of the large diameter hole 52. An opening 55a of the low-pressure connecting hole 55 is connected with the low-pressure piping 352.

A cylindrical collar part 51c projected from the side surface 51a is formed at an open end portion of the large diameter hole 52.

The aforementioned double pipe 4 is subjected to a pre-processing for use in the double pipe connection structure A according to the present embodiment 1. This pre-processing is described.

The pre-processing consists of an outer pipe and supporting rib removing process, an outer pipe diameter expanding process, an inner pipe diameter expanding process, a depressed groove forming process, and an O-ring mounting process.

First, in the outer pipe and supporting rib removing process, the outer pipe 42 and supporting rib 43 at a distal end portion of the double pipe 4 are cut. Then, the double pipe 4 in a state after extrusion molding shown in FIG. 6 is processed to have a shape that an inner pipe end portion 41*a* is projected from the end of the outer pipe 42, as shown in FIG. 7.

Figure 7:
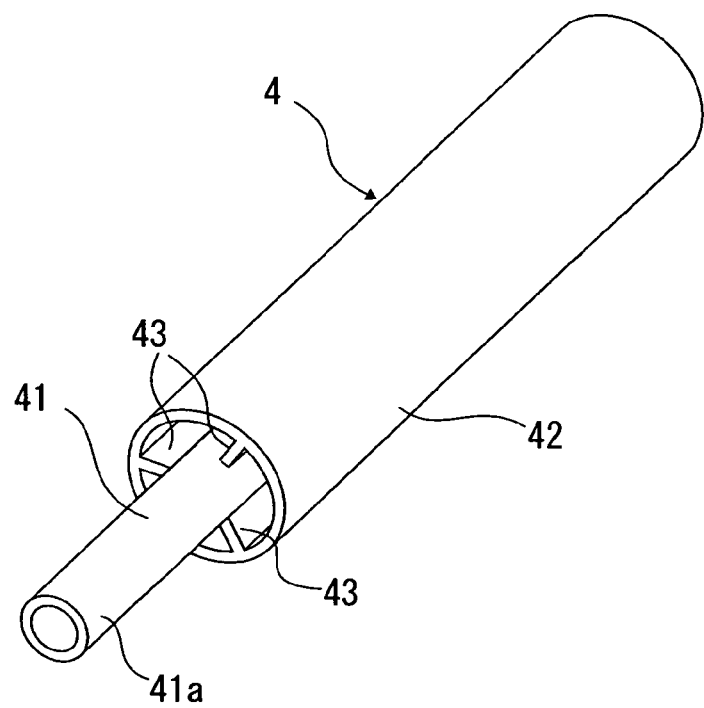
FIG. 7 is a perspective view illustrating a process to remove an outer pipe and a supporting rib of the double pipe used for the double pipe connection structure A according to embodiment 1.
Figure 8:
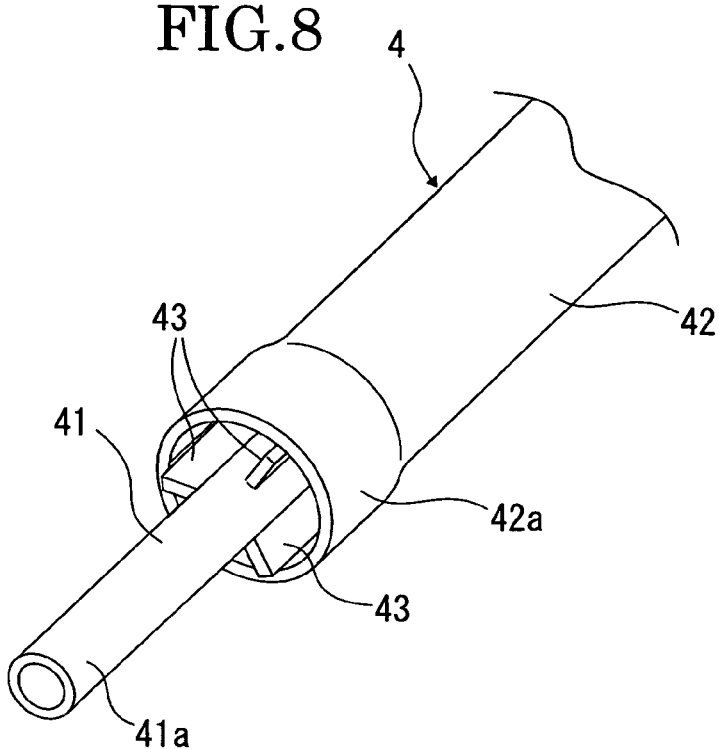
FIG. 8 is a perspective view illustrating a process to expand a diameter of the outer pipe of the double pipe used for the double pipe connection structure A according to embodiment 1.

In the next outer pipe diameter expanding process, first, an inner periphery of the outer pipe 42 and an end in an outer radial direction of the supporting rib 43 are detached from each other at the distal end portion of the outer pipe 42 of the double pipe 4 processed to have the shape of FIG. 7. Next, as shown in FIG. 8, the diameter of the outer pipe end portion detached from the supporting rib 43 is expanded to form an outer pipe expanded part 42*a*. This deformation accompanied with formation of the outer pipe expanded part 42*a* causes a position of the end of the outer pipe 42 to displace in a proximal direction of the double pipe 4. Consequently, the supporting rib 43 is projected from the distal end of the outer pipe expanded part 42*a* by the amount of displacement, as shown in FIG. 4.

In the following inner pipe diameter expanding process, in the inner pipe end portion 41*a*, the diameter of the distal end portion is expanded to form an inner pipe expanded part 41*b* shown in FIG. 9.

Figure 4:
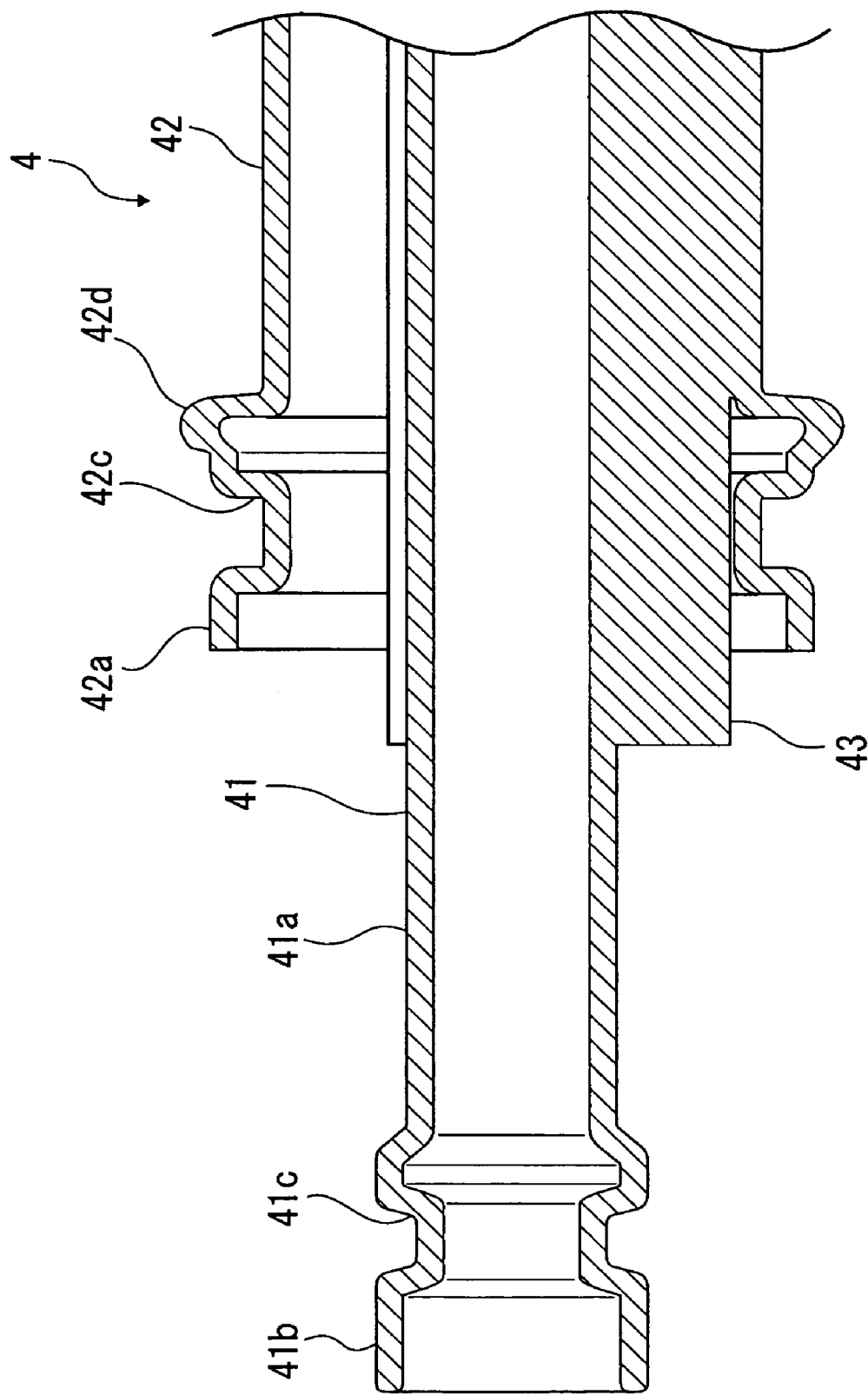
FIG. 4 is a sectional view showing a double pipe of the double pipe connection structure A according to embodiment 1.

In the next depressed groove forming process, the inner pipe expanded part 41*b* is depressed in an inner radial direction to form an inner pipe depressed groove 41*c* shown in FIG. 4 around the periphery of the inner pipe expanded part 41*b*, and the outer pipe expanded part 42*a* is depressed in an inner radial direction to form an outer pipe depressed groove 42*c* shown in FIG. 4 around the periphery of the outer pipe expanded part 42*a* (see FIG. 4).

At this time, an inner diameter of the part in which the inner pipe depressed groove 41*c* is formed is formed approximately equal to an inner diameter of a general part of the inner pipe end portion 41*a*. In the case of the outer pipe depressed groove 42*c*, the supporting rib 43 exists in the inner radial direction of the outer pipe depressed groove 42*c*. Accordingly, an inner diameter of a part in which the outer pipe depressed groove 42*c* is formed is formed equal to an inner diameter of a general part of the outer pipe 42, or not less than that.

Simultaneously with the processing to form the outer pipe depressed groove 42*c*, a bead part 42*d* is formed to be projected in the outer radial direction around the periphery of a proximal end of the outer pipe expanded part 42*a*. This bead part 42*d* is formed to be larger than an inner diameter of the opening edge of the large diameter hole 52 and smaller than an inner diameter of a collar part 51*c*.

At the time when completing the above-mentioned processes, the double pipe 4 is in a state shown in FIG. 4.

In the following O-ring mounting process, an inner pipe side O-ring 61 is mounted on the inner pipe depressed groove 41*c*, and an outer pipe side O-ring 62 is mounted on the outer pipe depressed groove 42*c*.

Figure 9:
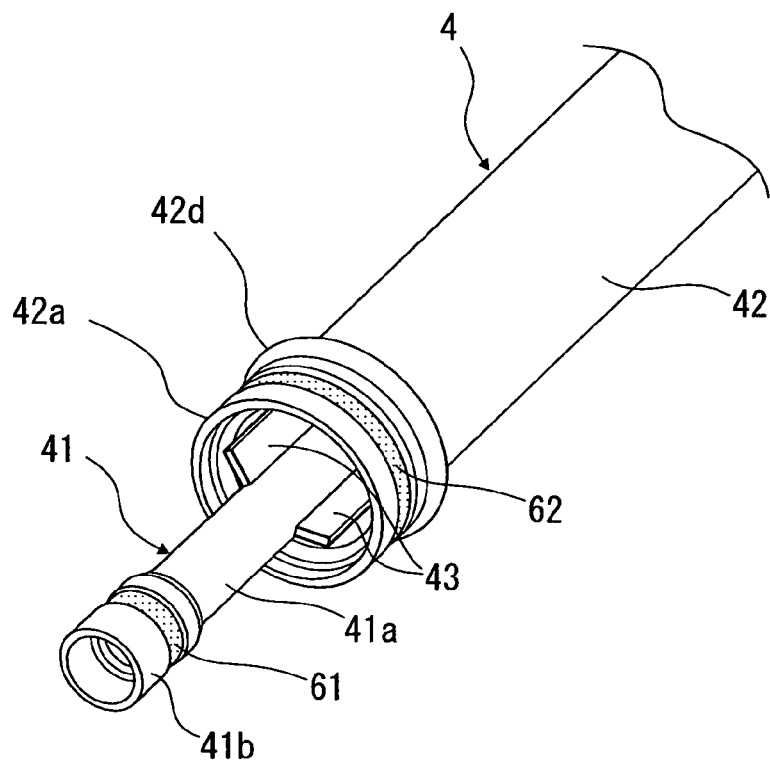
FIG. 9 is a perspective view showing a state where the previous process of the double pipe used for the double pipe connection structure A according to embodiment 1 is completed.

The double pipe 4 after subjected to the above-mentioned previous process is in a state shown in FIG. 9.

Next, the double pipe 4 after subjected to the previous process is connected with the joint member 5.

Figure 3:
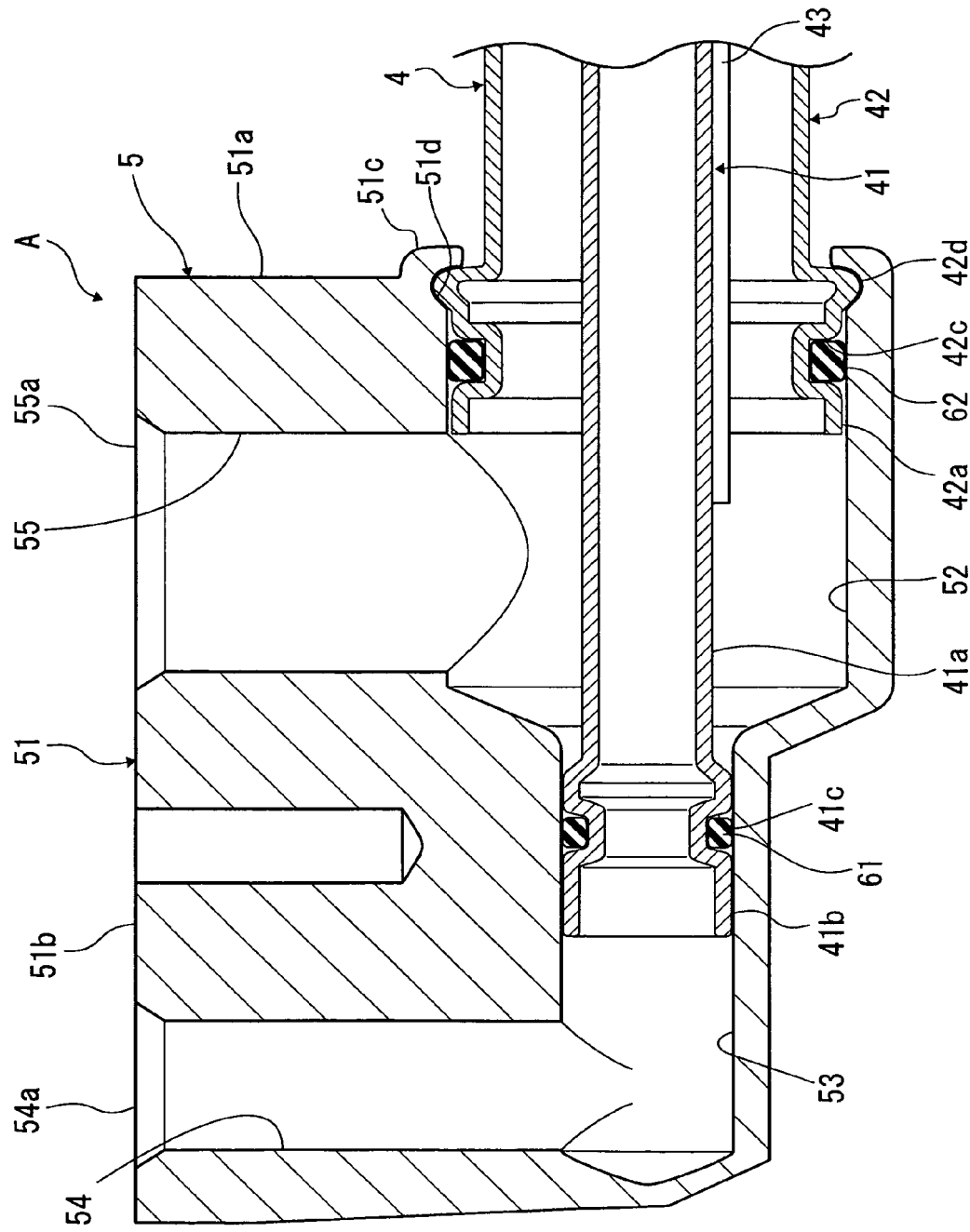
FIG. 3 is a sectional view showing the double pipe connection structure A according to embodiment 1.
Figure 10:
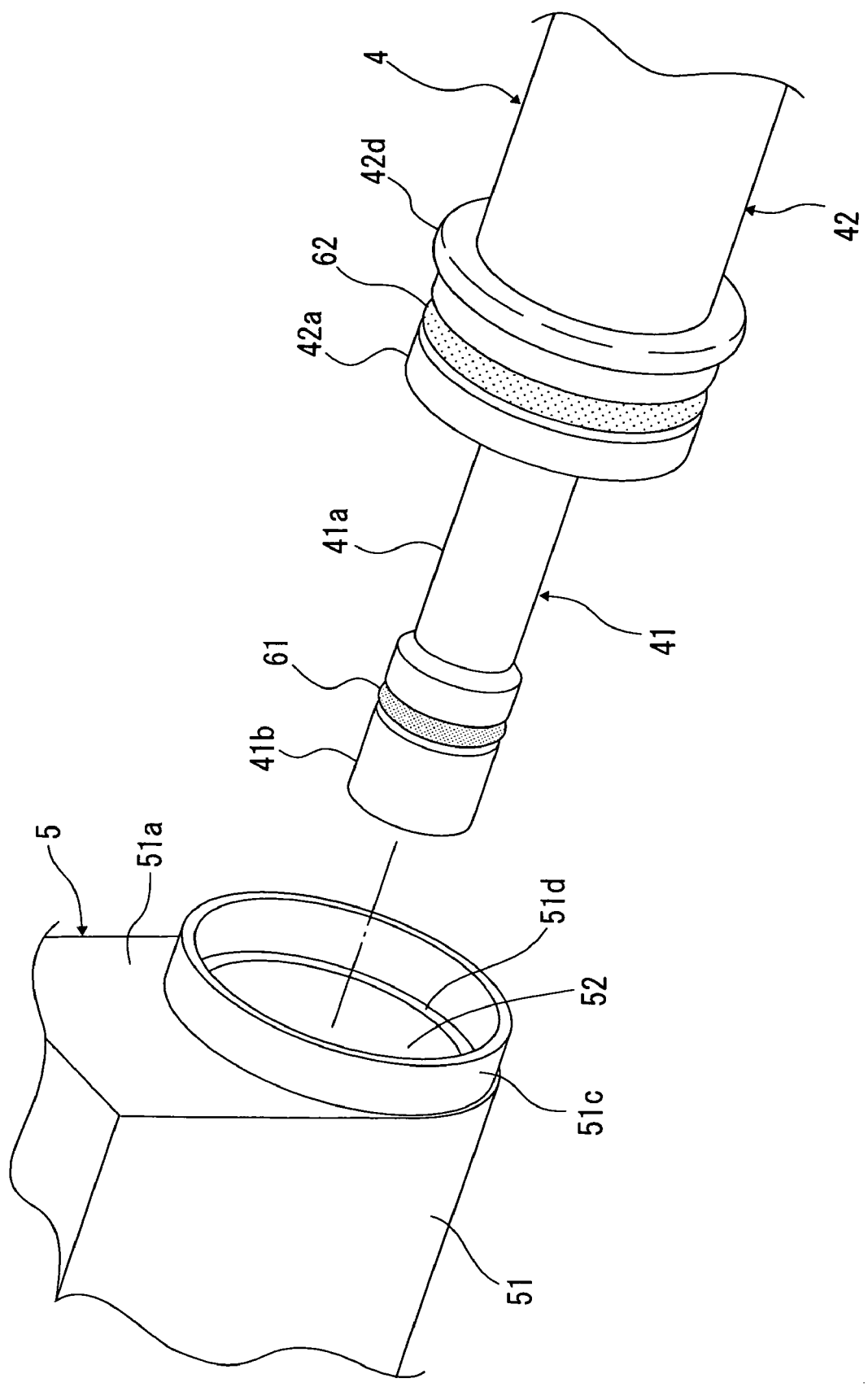
FIG. 10 is a perspective view showing a manner that the double pipe 4 is inserted into a joint member in the double pipe connection structure A according to embodiment 1.

In this case, as shown in FIG. 10, the inner pipe end portion 41*a* of the double pipe 4 is inserted into the large diameter hole 52 of the side surface 51*a* of the joint member 5. Then, as shown in FIG. 3, the inner pipe expanded part 41*b* at the distal end of the inner pipe 41 is inserted into the small diameter hole 53 while the inner pipe side O-ring 61 is compressed and deformed. Simultaneously, the outer pipe expanded part 42*a* is inserted into the large diameter hole 52 while the outer pipe side O-ring 62 is compressed and deformed. This insertion is performed until the bead part 42*d* of the outer pipe 42 abuts against a stepped part 51*d* formed because of a difference of the diameter between the opening of the large diameter hole 52 and the collar part 51*c*.

Thus, an amount of insertion into the large diameter hole 52 of the joint member 5 is the amount until the bead part 42*d* abuts against the stepped part 51*d* of the joint member 5, as mentioned above. Therefore, control of this insertion amount is easy and reliable, and workability is excellent.

Finally, as shown in FIGS. 1 and 3, the collar part 51*c* of the joint member 5 is caulked so as to cover the bead part 42*d*.

In the double pipe connection structure A according to the embodiment 1 thus connected, the high-pressure refrigerant supplied from the high-pressure piping 351 is introduced into the small diameter hole 53 from the high-pressure connecting hole 54 in the joint member 5. Subsequently, the high-pressure refrigerant passes through the inner pipe 41 of the double pipe 4, and flows to the expansion valve 34*b*.

Moreover, the refrigerant, which has passed through the rear evaporator 21 to have a low-pressure, passes through a space between the outer pipe 42 and the inner pipe 41 of the double pipe 4. The refrigerant flows into the large diameter hole 52 of the joint member 5, and subsequently, flows from the large diameter hole 52 through the low-pressure connecting hole 55 to the low-pressure piping 352.

At this time, the inner-pipe side O-ring 61 mounted on the outer periphery of the inner pipe expanded part 41*b* of the inner pipe 4 securely seals the space between the small diameter hole 53 in which the high-pressure refrigerant flows and the large diameter hole 52 in which the low-pressure refrigerant flows.

Additionally, the outer pipe side O-ring 62 mounted on the outer pipe expanded part 42*a* of the outer pipe 42 securely seals the space between the outside and the large diameter hole 52 in which the low-pressure refrigerant flows.

In this case, in comparison with sealing by brazing, fluctuation depending on workers, fluctuation in melting of a brazing material or the like can be avoided, thereby making it possible to obtain secure and reliable sealing performance.

Moreover, the inner pipe depressed groove 41*c* is formed at the inner pipe expanded part 41*b*, and formed to have the inner diameter approximately equal to the inner diameter of the general part of the inner pipe end portion 41*a*. For this reason, in comparison with a case where the inner pipe depressed groove 41*c* is formed at the inner pipe end portion 41*a*, a part of the inner pipe depressed groove 41*c* can be prevented from causing flow resistance when the refrigerant flows through the inner pipe 41.

Similarly, the outer pipe depressed groove 42*c* is formed at the outer pipe expanded part 42*a*, and formed to have the inner diameter not less than the inner diameter of the general part of the outer pipe 42. For this reason, in comparison with a case where the outer pipe depressed groove is formed by reducing the diameter of the inner diameter part of the general part of the outer pipe 42, a part between the outer pipe 42 and the inner pipe 41 can be prevented from causing flow resistance when the refrigerant flows between the outer pipe 42 and the inner pipe 41.

As mentioned above, since the flow resistance of the refrigerant can be suppressed, circulation of the refrigerant can be stabilized and air conditioning performance can be improved.

As described above, effects to be listed can be obtained in the double pipe connection structure A according to the present embodiment 1 as follows.

a) Since no additional component is used for connection between the double pipe 4 and the joint member 5, the number of components can be reduced and cost reduction can be attained in comparison with a case where an additional component is used.

b) Sealing between the low-pressure part and high-pressure part of the refrigerant is performed by the inner pipe side O-ring 61, and sealing between the low-pressure part and the outside is performed by the outer pipe side O-ring 62. For this reason, sealing performance can be stabilized compared with sealing by brazing.

c) The outer pipe expanded part 42a is formed at the distal end portion of the outer pipe 42, and the outer periphery of the outer pipe expanded part 42a is inserted into the large diameter hole 52 of the joint member 5. For this reason, when multiple specifications are provided in an inner diameter dimension of the large diameter hole 52 of the joint member 5, it is possible to form the outer diameter of the outer pipe expanded part 42a depending on the inner diameter, and to obtain excellent connection flexibility.

d) Since the outer pipe 42 is detached from the supporting rib 43 and the supporting rib 43 is left integral with the inner pipe 41 in formation of the outer pipe expanded part 42a, rigidity of the inner pipe 41 and rigidity of the outer pipe 42 can be secured in comparison with a case where the supporting rib 43 is removed in a range that the outer pipe expanded part 42a is formed. Accordingly, support rigidity and durability can be improved, and simultaneously, maintaining performance of coaxiality of the inner pipe 41 and the outer pipe 43 can be improved.

e) The inner pipe depressed groove 41c is formed at the inner pipe expanded part 41b formed by expanding the inner diameter of the inner pipe 41, and the inner diameter of the inner pipe expanded part 41b is formed approximately equal to the inner diameter of the general part of the inner pipe end portion 41a. For this reason, in comparison with a case where the inner pipe depressed groove is formed by reducing the diameter of the general part of the inner pipe 41, a part of the inner pipe depressed groove 41c can be prevented from causing flow resistance. Thereby, it is possible to attain stabilization of flow of the refrigerant and to improve air conditioning performance.

f) The outer pipe depressed groove 42c is formed at the outer pipe expanded part 42a formed by expanding the inner diameter of the outer pipe 42, and the inner diameter of the outer pipe expanded part 42a is not less than the inner diameter of the general part of the outer pipe 42. For this reason, in comparison with a case where the outer pipe depressed groove is formed by reducing the diameter of the general part of the outer pipe 42, it is possible to suppress flow resistance of the refrigerant, to attain stabilization of flow of the refrigerant, and to improve the air conditioning performance.

g) When the outer pipe side O-ring 62 is inserted into the large diameter hole 52 by a predetermined amount at the time of insertion of the double pipe 4 into the large diameter hole 52 of the joint member 5, the bead part 42d abuts against the stepped part 51d of the opening of the large diameter hole 52, so that further insertion is restricted. Therefore, control of the amount of insertion of the double pipe is easy and reliable, and workability is excellent.

h) The collar part 51c of the joint member 5 is caulked to the bead part 42d projected from the outer pipe 42 in the outer radial direction. For this reason, it is easy to ensure strength of the caulked part in the axial direction.

[Embodiment 2]

Figure 11:
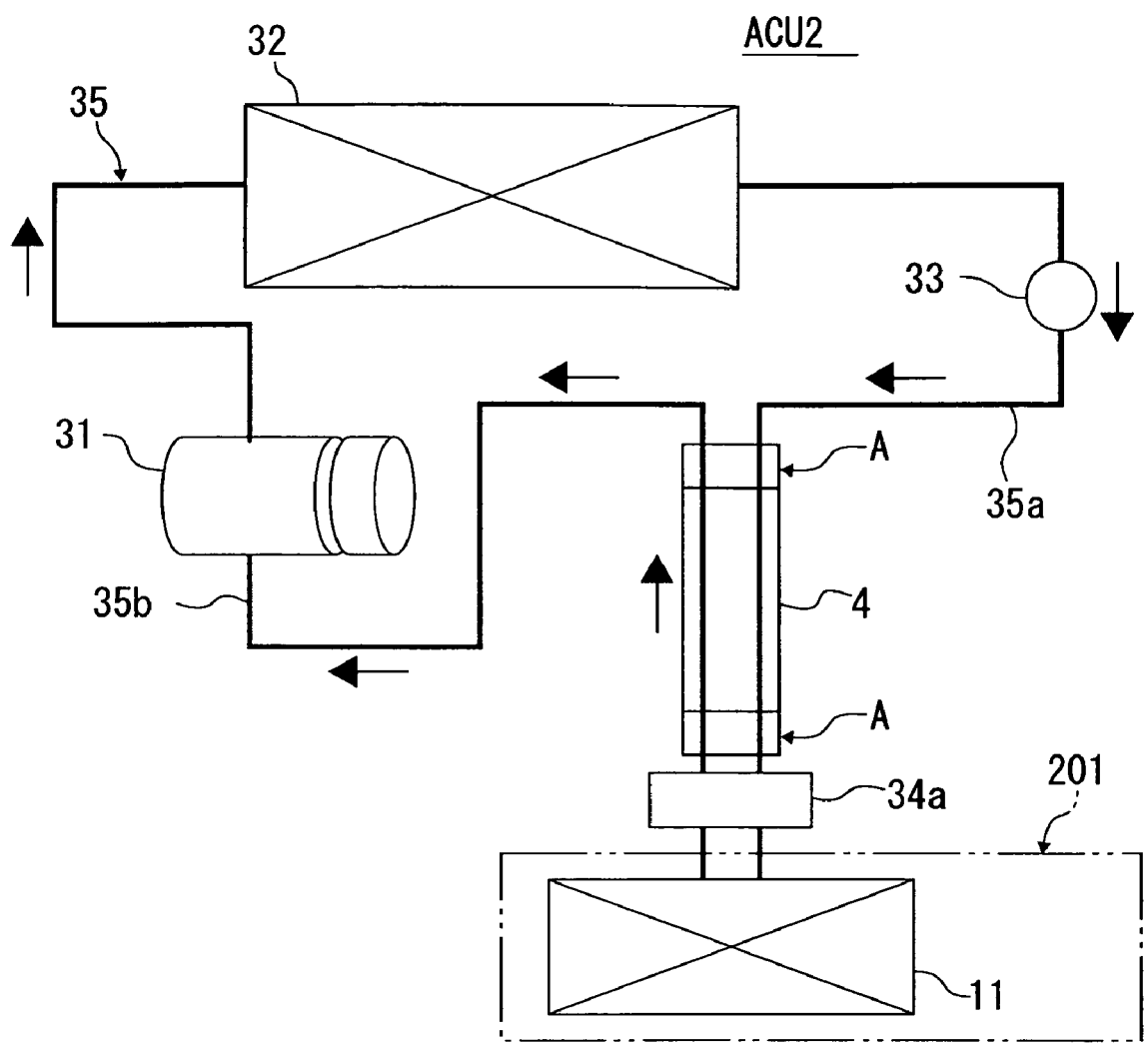
FIG. 11 is an overall system diagram showing other air-conditioner ACU2 for a vehicle to which the double pipe connection structure A according to embodiment 1 is applied.

Next, on the basis of FIG. 11, description is given on an embodiment 2 of the present invention.

In this embodiment 2, as an example, the double pipe connection structure A according to the embodiment 1 is used for an air-conditioner ACU2 for a vehicle different from that shown in the embodiment 1. In other words, the air-conditioner ACU2 for the vehicle shown in the embodiment 2 is used, as an example, in a general structure in which only one air-conditioning unit 201 is mounted in the vehicle. Unlike the embodiment 1, the backseat side air-conditioning unit 2, and the high-pressure piping 351 as well as the low-pressure piping 352 connected thereto are removed. Other structures are the same as those in the embodiment 1.

Thus, the present invention can also be used for the general air-conditioner ACU2 for the vehicle in which only one air-conditioning unit 201 is mounted.

As mentioned above, the preferable embodiments 1 and 2 according to the present invention has been explained in detail with reference to the drawings. However, the present invention is not limited to these embodiments 1 and 2, and includes modifications in design without departing from the scope of the present invention.

For example, although an example in which the present invention is used for an air-conditioner for a vehicle is shown in the embodiments 1 and 2, the present invention can, of course, be used for any air-conditioner other than a vehicle that has a structure where the double pipe is connected to the joint member. Moreover, the present invention can be used for industrial machines or the like other than air-conditioners.

Although an example in which the inner pipe side O-ring 61 and the outer pipe side O-ring 62 are respectively mounted on the inner pipe depressed groove 41c and the outer pipe depressed groove 42c has been shown in the embodiment 1, the present invention is not limited to an arrangement in which the O-ring is mounted on the depressed groove formed by deforming the outer pipe and the inner pipe into the inner radial direction, as mentioned above. In other words, a pair of protrusions formed by protruding the outer pipe and the inner pipe in the outer radial direction may be formed, and the O-ring may be mounted on the pair of protrusions. This case has an advantage in a viewpoint of flow resistance since the inner diameter of the part on which the O-ring is mounted is not reduced.

Although an example in which the inner pipe expanded part 41b is formed at the inner pipe end portion 41a and the inner pipe depressed groove 41c is formed at this inner pipe expanded part 41b has been shown in the embodiment 1, the present invention is not limited to this. For example, the inner pipe end portion 41a may be formed to have the same diameter as that of other part of the inner pipe 41, and the inner pipe depressed groove may be formed at this part.

Although in the embodiment 1, the bead part 42d is formed around the periphery of the outer pipe expanded part 42a, and this bead part 42d is abutted against the stepped part 51d of the opening part of the large diameter hole 52 of the joint member 5, the present invention is not limited to this. For example, without forming the bead part around the periphery, the distal end of the outer pipe expanded part 42a is abutted against the step formed at the large diameter hole 52, and the collar part 51c of the joint member 5 may be caulked to the stepped part formed by the outer pipe expanded part 42a and the general part.

Moreover, although the bead part 42d is abutted against the stepped part 51d in the embodiment 1, for an arrangement to control the amount of insertion as mentioned above, a projection may be provided around the periphery of the outer pipe expanded part 42a. Alternatively, multiple projections may be radially formed, not around the periphery of the outer pipe expanded part 42a As mentioned above, since no additional component is used for connection between the double pipe and the joint member in the double pipe connection structure according to the present invention, the number of the components can be reduced and cost reduction can be attained in comparison with the case where an additional component is used.

In the present invention, sealing between the small diameter hole side and the large diameter hole side is performed by the inner pipe side O-ring, and the outer pipe side O-ring performs sealing between the large diameter hole and the outside. For this reason, sealing performance can be stabilized compared with sealing by brazing.

Moreover, the outer pipe expanded part is formed at the distal end portion of the outer pipe, and this outer pipe expanded part is inserted into the inner diameter of the large diameter hole of the joint member. For this reason, when multiple specifications are provided in the inner diameter of the major diameter of the joint member, the outer diameter of the outer pipe expanded part can be formed depending on the inner diameter, and different specifications can be dealt with, thus obtaining excellent connection flexibility.

In addition, since the outer pipe is detached from the supporting rib and the supporting rib is left integral with the inner pipe in formation of the outer pipe expanded part, in the range in which the outer pipe expanded part is formed, the rigidity of the inner pipe and the rigidity of the outer pipe are secured in comparison with the case where the supporting rib is removed. Accordingly, support rigidity and durability can be improved, and simultaneously, the maintaining performance of the coaxiality of the inner pipe and the outer pipe can be improved.

Moreover, since the outer pipe side O-ring is mounted on the outer pipe depressed groove formed at the outer pipe expanded part whose diameter is expanded more than that of the general part, the inner diameter of the outer pipe expanded part can be expanded and flow resistance of the fluid can be suppressed by an amount of expansion, compared with a case where the outer pipe depressed groove is formed at the general part of the outer pipe.

Furthermore, since the inner pipe side O-ring is mounted on the inner pipe depressed groove formed at the inner pipe expanded part whose diameter is expanded more than that the inner pipe end portion, the inner diameter of the inner pipe expanded part can be expanded and flow resistance of the fluid can be suppressed by an amount of expansion, compared with a case where the inner pipe depressed groove is formed at the general part of the inner pipe.

Additionally, at the time of insertion of the double pipe into the large diameter hole of the joint member, when the outer pipe side O-ring is inserted in the large diameter hole by the predetermined amount, the bead part abuts against the opening edge part of the large diameter hole so that further insertion is restricted. In this state, the edge part of the large diameter hole of the joint member is caulked to the bead part.

Therefore, control of the amount of insertion of the double pipe is easy and reliable, and workability is excellent. Additionally, since a caulking part on the side of the joint member is caulked to the bead part projected from the outer pipe end portion, it is easy to increase connection strength because of strong caulking effect in the axial direction.

The double pipe connection structure can be obtained by sequentially performing the outer pipe and supporting rib removing process, the outer pipe diameter expanding process, the O-ring mounting process, the double pipe inserting process, and the caulking process.

With the double pipe connection structure obtained through these processes, it is possible to attain cost reduction, stabilization of sealing performance, and improvement in connection flexibility, support rigidity and durability, as mentioned above.

Furthermore, since the diameter is expanded in the outer pipe diameter expansion process after detaching the distal end portion of the outer pipe from the supporting rib, the diameter can be easily expanded, and simultaneously, deformation of the inner pipe in this diameter expanding process can be prevented.

What is claimed is:
1. A double pipe connection structure, comprising:
a double pipe including an inner pipe, an outer pipe and a supporting rib, the inner pipe and the outer pipe being coaxially arranged and the supporting rib being integrally formed in the double pipe in an axial direction, such that the supporting rib connects the inner pipe to the outer pipe;
an inner pipe side O-ring;
an outer pipe side O-ring; and
a joint member including:
a first hole into which the outer pipe is inserted;
a second hole having a diameter that is smaller than a diameter of the first hole and into which the inner pipe is inserted;
a first-pressure connecting hole communicating with the first hole; and
a second-pressure connecting hole communicating with the second hole,
wherein a pressure in the first-pressure connecting hole is lower than a pressure in the second-pressure connecting hole,
wherein the first hole and the second hole are bored within the joint member so as to be aligned in the axial direction,
wherein an end of the inner pipe extends beyond a corresponding end of the outer pipe and the end of the inner pipe is hermetically sealed in the second hole by the inner pipe side O-ring disposed between an inner periphery of the second hole and an outer periphery of the inner pipe,
wherein the corresponding end of the outer pipe includes an end portion having an outer pipe expanded part, the outer pipe expanded part of the outer pipe having an outer diameter that is larger than an outer diameter of a portion of the outer pipe adjacent to the end portion of the outer pipe, wherein the outer pipe expanded part of the outer pipe is hermetically sealed in the first hole by the outer pipe side O-ring disposed between an inner periphery of the first hole and an outer periphery of the outer pipe, wherein the supporting rib of the double pipe is detached from the outer pipe at the outer pipe expanded part of the outer pipe and the supporting rib remains connected to the inner pipe at the outer pipe expanded part of the outer pipe, wherein the outer pipe expanded part of the outer pipe includes a bead part projecting from the outer pipe expanded part in a radial direction, wherein the joint member includes a stepped part with which the bead part engages as the outer pipe expanded part of the outer pipe is inserted into the first hole, so as to control an amount of insertion of the outer pipe expanded part into the first hole, and wherein the joint member includes a collar part which is caulked onto the bead part of the outer pipe expanded part, such that the collar part combines the outer pipe with the joint member.

2. The double pipe connection structure according to claim 1, wherein the outer pipe side O-ring is mounted in an outer pipe depressed groove formed around a periphery of the end portion of the outer pipe.

3. The double pipe connection structure according to claim 1, wherein an inner pipe expanded part having an expanded inner diameter is formed at an end portion of the inner pipe, and wherein the inner pipe side O-ring is mounted in an inner pipe depressed groove formed around a periphery of the inner pipe expanded part.

* * * * *